United States Patent
Kawade

(10) Patent No.: US 8,773,590 B2
(45) Date of Patent: Jul. 8, 2014

(54) VIDEO OUTPUT APPARATUS, DISPLAY SYSTEM, AND VIDEO OUTPUT METHOD FOR OUTPUTTING VIDEO SIGNAL TO DISPLAY APPARATUS

(75) Inventor: Takahisa Kawade, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 54 days.

(21) Appl. No.: 13/327,685

(22) Filed: Dec. 15, 2011

(65) Prior Publication Data

US 2012/0086859 A1    Apr. 12, 2012

Related U.S. Application Data

(63) Continuation of application No. 12/360,798, filed on Jan. 27, 2009, now Pat. No. 8,405,775.

(30) Foreign Application Priority Data

Feb. 5, 2008  (JP) .................................. 2008-025234

(51) Int. Cl.
| | | |
|---|---|---|
| H04N 7/00 | (2011.01) | |
| H04N 11/00 | (2006.01) | |
| H04N 5/232 | (2006.01) | |
| H04N 5/50 | (2006.01) | |

(52) U.S. Cl.
USPC ......... 348/552; 348/473; 348/569; 348/211.5

(58) Field of Classification Search
USPC ......... 348/239, 468, 588, 383, 552–570, 473, 348/474, 705, 706, 207.1, 211.1, 211.3, 348/211.5
See application file for complete search history.

(56) References Cited

U.S. PATENT DOCUMENTS

| | | | | |
|---|---|---|---|---|
| 5,946,046 A | * | 8/1999 | You et al. ....................... | 348/468 |
| 5,959,686 A | * | 9/1999 | Jeong ............................. | 348/563 |
| 6,724,981 B1 | * | 4/2004 | Park et al. ...................... | 386/231 |

FOREIGN PATENT DOCUMENTS

| | | |
|---|---|---|
| JP | 2007-288310 A | 11/2007 |
| JP | 2009-118037 A | 5/2009 |

* cited by examiner

Primary Examiner — Michael Lee
(74) Attorney, Agent, or Firm — Canon USA, Inc., IP Division

(57) ABSTRACT

A video output apparatus includes an attribute information acquisition unit that acquires attribute information of a display apparatus through a communication unit, a determination unit that determines whether to superimpose additional information on a video signal based on the attribute information of the display apparatus acquired by the attribute information acquisition unit, an output unit that superimposes the additional information extracted by an additional information extraction unit on the video signal output from a video decoding unit and outputs the additional information superimposed on the video signal to the communication unit if the determination unit determines to superimpose the additional information on the video signal, and outputs the video signal output from the video decoding unit to the communication unit without superimposing the additional information on the video signal if the determination unit determines not to superimpose the additional information on the video signal.

20 Claims, 14 Drawing Sheets

FIG. 3

| MANUFACTURER NAME | MODEL NUMBER | SUB DISPLAY INCLUDED/NOT INCLUDED | INFORMATION THAT CAN BE DISPLAYED ON SUB DISPLAY |
|---|---|---|---|
| AAA | A-○○X1000 | NOT INCLUDED | — |
| AAA | A-○○X2000 | NOT INCLUDED | — |
| AAA | A-○○X3000 | INCLUDED | FILE NAME, SHOOTING DATE AND TIME |
| BBB | B-○○X1000 | NOT INCLUDED | — |
| BBB | B-○○X2000 | INCLUDED | FILE NAME, SHOOTING DATE AND TIME, SHUTTER SPEED, ISO SENSITIVITY |
| BBB | B-○○X3000 | INCLUDED | FILE NAME, SHOOTING DATE AND TIME, SHUTTER SPEED, ISO SENSITIVITY, THUMBNAIL IMAGE |
| ⋮ | | | ⋮ |

FIG. 7

| MANUFACTURER NAME | MODEL NUMBER | NON-COMBINED TRANSMISSION FUNCTION |
|---|---|---|
| AAA | A-○○Y1000 | NONCOMPLIANT |
| AAA | A-○○Y2000 | NONCOMPLIANT |
| AAA | A-○○Y3000 | COMPLIANT |
| BBB | B-○○Y1000 | NONCOMPLIANT |
| BBB | B-○○Y2000 | COMPLIANT |
| BBB | B-○○Y3000 | COMPLIANT |
| ... | ... | ... |

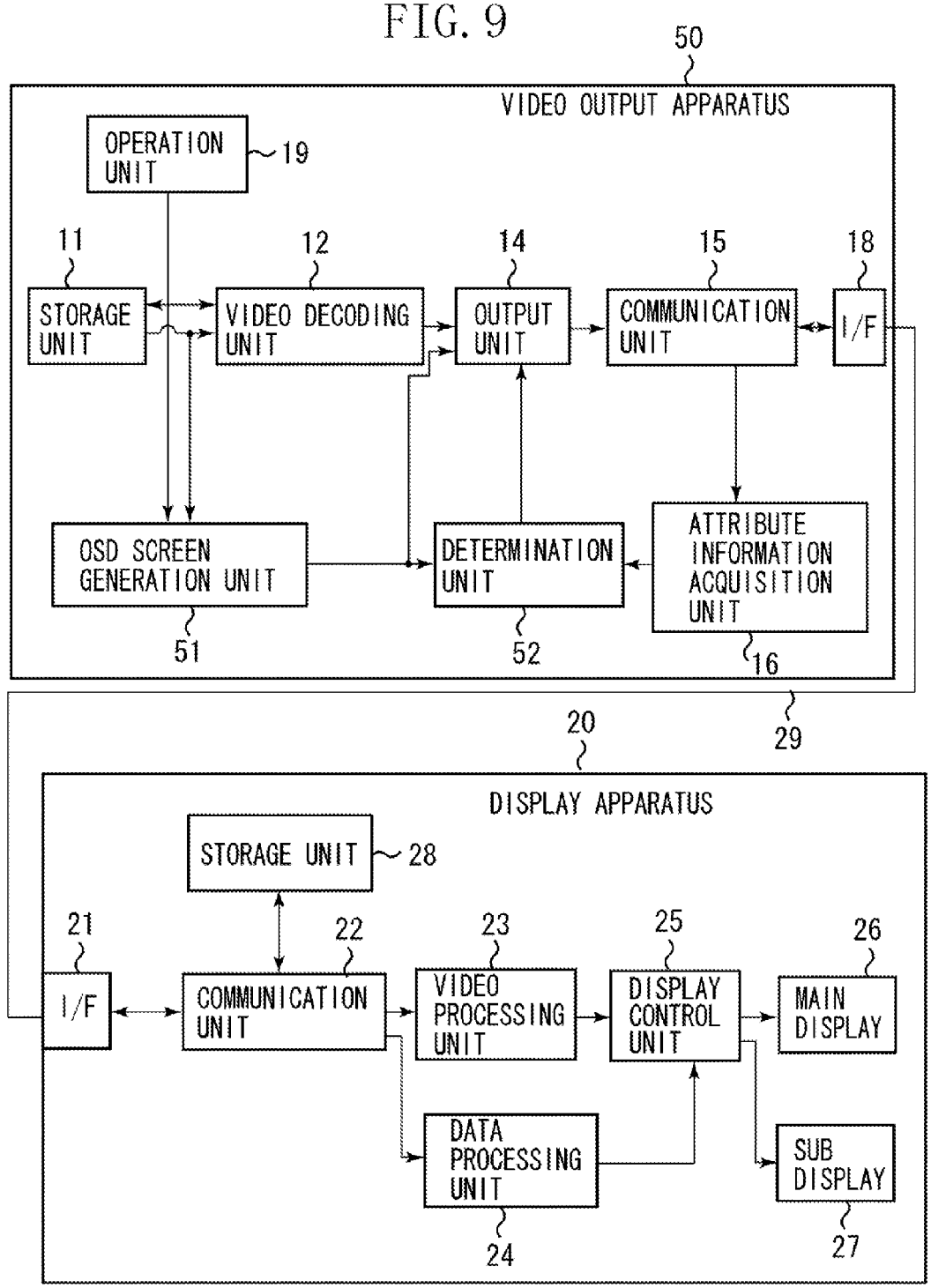

FIG. 10

| MANUFACTURER NAME | MODEL NUMBER | SUB DISPLAY INCLUDED/NOT INCLUDED | INFORMATION THAT CAN BE DISPLAYED ON SUB DISPLAY |
|---|---|---|---|
| AAA | A-OOZ1000 | NOT INCLUDED | — |
| AAA | A-OOZ2000 | NOT INCLUDED | — |
| AAA | A-OOZ3000 | INCLUDED | STILL IMAGE REPRODUCTION MENU |
| BBB | B-OOZ1000 | NOT INCLUDED | — |
| BBB | B-OOZ2000 | INCLUDED | STILL IMAGE REPRODUCTION MENU, MOVING IMAGE REPRODUCTION MENU |
| BBB | B-OOZ3000 | INCLUDED | STILL IMAGE REPRODUCTION MENU, MOVING IMAGE REPRODUCTION MENU, STILL IMAGE EDITING MENU, MOVING IMAGE EDITING MENU |
| ... | ... | ... | ... |

VIDEO OUTPUT APPARATUS, DISPLAY SYSTEM, AND VIDEO OUTPUT METHOD FOR OUTPUTTING VIDEO SIGNAL TO DISPLAY APPARATUS

CROSS REFERENCE TO RELATED APPLICATIONS

The present application is a continuation of U.S. patent application Ser. No. 12/360,798, filed Jan. 27, 2009, entitled "VIDEO OUTPUT APPARATUS, DISPLAY SYSTEM, AND VIDEO OUTPUT METHOD FOR OUTPUTTING VIDEO SIGNAL TO DISPLAY APPARATUS", the content of which is expressly incorporated by reference herein in its entirety. Further, the present divisional application claims priority from Japanese Patent Application No. 2008-025234 filed Feb. 5, 2008, which is also hereby incorporated by reference herein in its entirety.

BACKGROUND OF THE INVENTION

1. Field of the Invention

The present invention relates to a video output apparatus, a display system, and a video output method configured to output a video signal to a display apparatus.

2. Description of the Related Art

Generally, when a camera is connected with a display apparatus, such as a television set, to reproduce image data in the camera and to display additional information, such as shooting information, on the display apparatus together on an image, the additional information is superimposed on the image data in the camera, and the additional information superimposed on the image data is output to the display apparatus.

Meanwhile, a television apparatus has been proposed that enables a viewer to enjoy a moving image such as a movie on a large screen while obtaining knowledge from character information or the like on a small screen without interrupting the viewing thereof (see Japanese Patent Application Laid-Open No. 11-225299). More specifically, the television apparatus includes a first unit having a first display that is a relatively large screen and a second unit having a second display that is a relatively small display. When a television signal having moving image information and additional information is received and displayed, the first display mainly displays the moving image information and the second display mainly displays the additional information.

As described above, when the image from the video output apparatus such as a digital camera, a video camera, a video recorder, or a digital versatile disc (DVD) player is displayed on the display apparatus such as a television set, the additional information is superimposed on the image data in the video output apparatus.

However, if the additional information is superimposed on the image data and is then superimposed on the image, the viewing of the image may be interrupted. Further, if a video signal superimposed on the additional information to be displayed on a small display in a digital camera or the like is supplied to a large display such as a television set, the additional information is enlarged and the fineness of the characters becomes worse. Further, in a case where various on screen display (OSD) images are displayed and superimposed on the image, a similar problem may occur.

SUMMARY OF THE INVENTION

The present invention is directed to a video output apparatus, a display system, and a video output method capable of outputting an image and information to a display apparatus in an appropriate transmission form based on attribute information of the display apparatus.

According to an aspect of the present invention, a video output apparatus configured to output a video signal to a display apparatus includes a storage unit configured to store image data and additional information associated with the image data, a decoding unit configured to decode the image data stored in the storage unit to generate a video signal, an acquisition unit configured to acquire attribute information of the display apparatus, a determination unit configured to determine whether to superimpose the additional information on the video signal based on the attribute information acquired by the acquisition unit, and an output unit configured to superimpose the additional information on the video signal and to output the additional information superimposed on the video signal and to the display apparatus if the determination unit determines to superimpose the additional information on the video signal, and to output the video signal and the additional information individually to the display apparatus without superimposing the additional information on the video signal if the determination unit determines not to superimpose the additional information on the video signal.

According to another aspect of the present invention, a video output apparatus configured to output a video signal to a display apparatus includes a generation unit configured to generate on screen display (OSD) image data, an acquisition unit configured to acquire attribute information of the display apparatus, a determination unit configured to determine whether to superimpose the OSD image data on the video signal based on the attribute information acquired by the acquisition unit, and an output unit configured to superimpose the OSD image data on the video signal and to output the OSD image data superimposed on the video signal to the display apparatus if the determination unit determines to superimpose the OSD image data on the video signal, and to output the video signal and the OSD image data individually to the display apparatus without superimposing the OSD image data on the video signal if the determination unit determines not to superimpose the OSD image data on the video signal.

According to an exemplary embodiment of the present invention, an image and additional information can be output to a display apparatus in an appropriate transmission form based on attribute information of the display apparatus.

BRIEF DESCRIPTION OF THE DRAWINGS

FIG. 3 is a diagram illustrating an example of a determination table used for the determination operation in the determination unit.

FIG. 7 is a diagram illustrating an example of a determination table used for the determination operation in the determination unit illustrated in FIG. 6.

FIG. 9 is a block diagram illustrating a configuration of a display system according to a second exemplary embodiment of the present invention.

FIG. 10 is a view illustrating an example of a determination table used for a determination operation in the determination unit illustrated in FIG. 9.

DETAILED DESCRIPTION OF THE EMBODIMENTS

Figure 1:
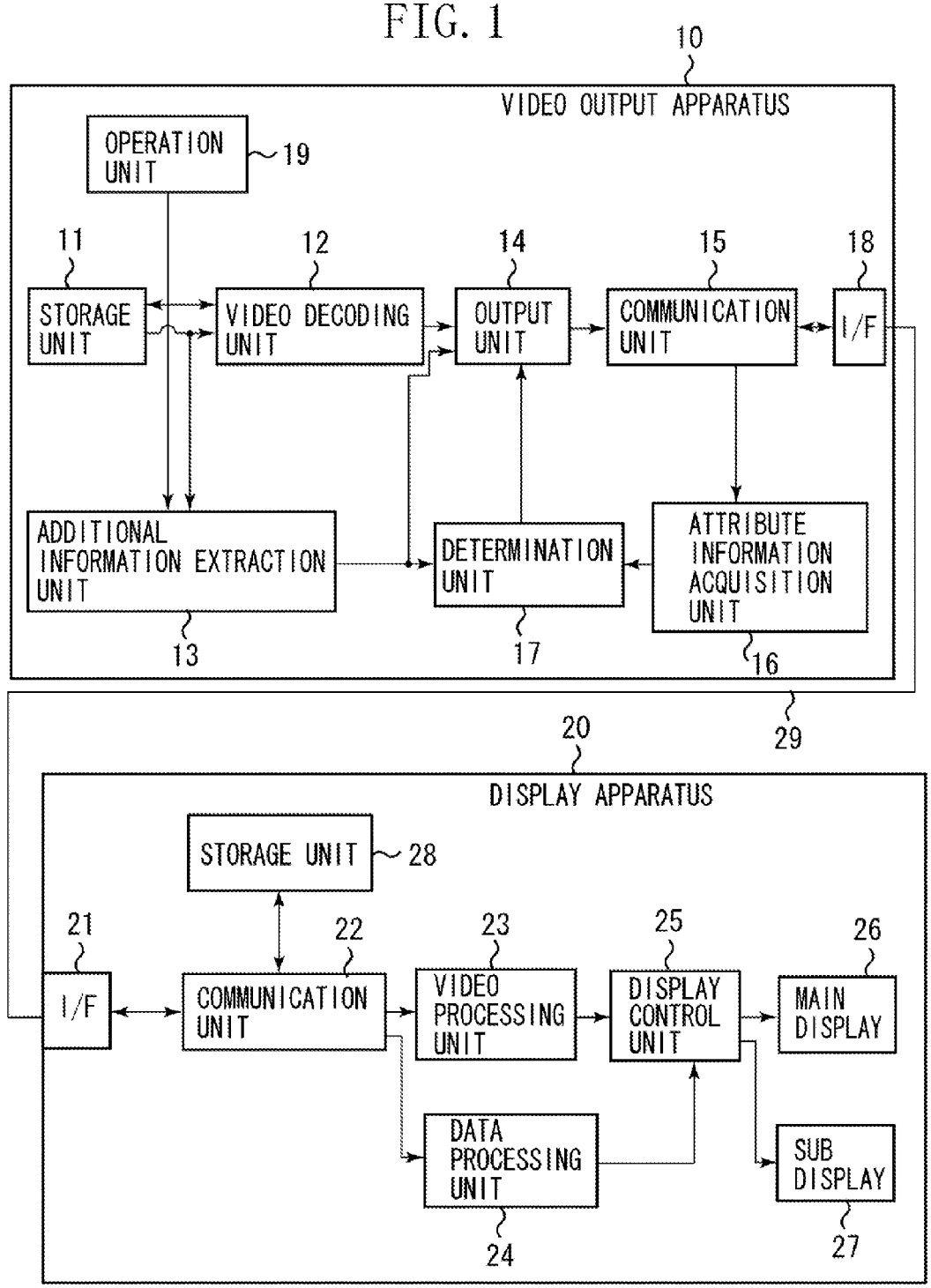
FIG. 1 is a block diagram illustrating a configuration of a display system according to a first exemplary embodiment of the present invention.

FIG. 1 is a block diagram illustrating a configuration of a display system according to a first exemplary embodiment of the present invention. The display system includes a video output apparatus 10 and a display apparatus 20 that are interconnected via a cable 29.

The video output apparatus 10 includes a storage unit 11, a video decoding unit 12, an additional information extraction unit 13, an output unit 14, a communication unit 15, an attribute information acquisition unit 16, a determination unit 17, a communication interface (I/F) 18, and an operation unit 19. The video output apparatus 10 is an apparatus that has a reproduction function, for example, a digital camera, a video camera, a video recorder, or a DVD player. The display apparatus 20 includes a communication I/F 21, a communication unit 22, a video processing unit 23, a data processing unit 24, a display control unit 25, a main display 26, a sub display 27, and a storage unit 28. The display apparatus 20 is an apparatus that has a display, for example, a television apparatus or a personal computer.

The storage unit 11 is, for example, a built-in hard disk drive (HDD), an external HDD, or a secure digital (SD) card. The storage unit 11 stores still image data, moving image data, and additional information associated with the data. For example, still image data of Joint Photographic Experts Group (JPEG) format is associated with additional information such as a file name and shooting information in Exchangeable image file (EXIF) format. Moving image data of Moving Picture Experts Group (MPEG) format is associated with an image packet, an audio packet, and further, packets of additional information such as a file name, program information, and caption information.

The operation unit 19 is a remote controller that can remotely operate the video output apparatus 10 or an operation key that is provided on a body of the video output apparatus 10. The operation unit 19 receives an operation instruction of a user such as an instruction for reproducing image data, an instruction for displaying additional information, or the like. The instruction for reproducing the image data is transmitted from the operation unit 19 to the storage unit 11 and the video decoding unit 12. The instruction for displaying the additional information is transmitted from the operation unit 19 to the additional information extraction unit 13.

The video decoding unit 12, when the instruction for reproducing the image data is issued by the user, reads the reproduction target image data from the storage unit 11, decodes the data, and generates a video signal. The additional information extraction unit 13, when the instruction for displaying the additional information is issued by the user, extracts additional information associated with the reproduction target image data from the storage unit 11 and outputs the additional information to the output unit 14 and the determination unit 17.

The communication unit 15 communicates with the display apparatus 20 via the communication I/F 18 and the cable 29. The communication unit 15 receives attribute information of the display apparatus 20 at the time of a start of a communication with the display apparatus 20 and transmits the attribute information to the attribute information acquisition unit 16. The attribute information acquisition unit 16 acquires the attribute information of the display apparatus 20 via the communication unit 15. The attribute information includes information used to recognize the number of displays included in the display apparatus 20 such as identification information (a manufacturer name, a model number, or the like) of the display apparatus 20.

The determination unit 17 determines whether to superimpose the additional information extracted by the additional information extraction unit 13 on the video signal output from the video signal decoding unit 12 based on the attribute information of the display apparatus 20 acquired by the attribute information acquisition unit 16. The output unit 14, in a case when the determination unit 17 determines to superimpose the additional information on the video signal, superimpose the additional information extracted by the additional information extraction unit 13 on the video signal output from the video decoding unit 12, and outputs the additional information superimposed on the video signal to the communication unit 15. The output unit 14, in a case when the determination unit 17 determines not to superimpose the additional information on the video signal, outputs the video signal output from the video decoding unit 12 and the additional information individually to the communication unit 15 without superimposing the additional information on the video signal.

The communication unit 15 transmits the video signal and the additional information output from the output unit 14 via the communication I/F 18 and the cable 29 to the display apparatus 20. The video signal and the additional information are transmitted through the same cable 29 via different transfer channels (transfer paths). The cable 29 is compliant with, for example, High Definition Multimedia Interface (HDMI) standard or Digital Visual Interface (DVI) standard. For example, in the case of the HDMI cable, the video signal is transmitted via a Transition Minimized Differential Signaling (TMDS) transfer channel. To transmit and receive the additional information and the attribute information, a Consumer Electronics Control (CEC) transfer channel or a Display Data Channel (DDC) transfer channel is used. Further, using a remote controller (not shown) of the display apparatus 20, the video output apparatus 10 can be operated. In such a case, an operation control signal is transmitted from the display apparatus 20 to the video output apparatus 10 via the CEC transfer channel.

The communication unit 22 communicates with the video output apparatus 10 via the communication I/F 21 and the cable 29. In the storage unit 28, the attribute information (identification information (a manufacturer name, a model number, or the like)) of the display apparatus 20 is stored in advance. The communication unit 22 reads the attribute information from the storage unit 28 at the time of a start of a communication with the video output apparatus 10. The communication unit 22 also receives a video signal and additional information transmitted from the video output apparatus 10, outputs the video signal to the video processing unit 23, and outputs the additional information to the data processing unit 24. The video processing unit 23 performs signal processing, such as an image quality correction, on the video signal received from the communication unit 22, and outputs the processed video signal to the display control unit 25. The data processing unit 24 reads the additional information received from the communication unit 22, performs various data processing, and outputs the processed information to the display control unit 25.

The display control unit 25 outputs the video signal from the video processing unit 23 to the main display 26 and outputs the additional information from the data processing unit 24 to the sub display 27. However, in a case where another information is displayed on the sub display 27 so that the additional information cannot be displayed on the sub display 27, the display control unit 25 superimposes the additional information output from the data processing unit 24 on the video signal output from the video processing unit 23 and outputs the additional information superimposed on the video signal to the main display 26.

The main display 26 is a large screen having a high resolution and a high expression ability. The sub display 27 is a small screen having a low resolution and a low expression ability. However, the sub display 27 can have a similar expression ability to the main display 26.

Figure 2:
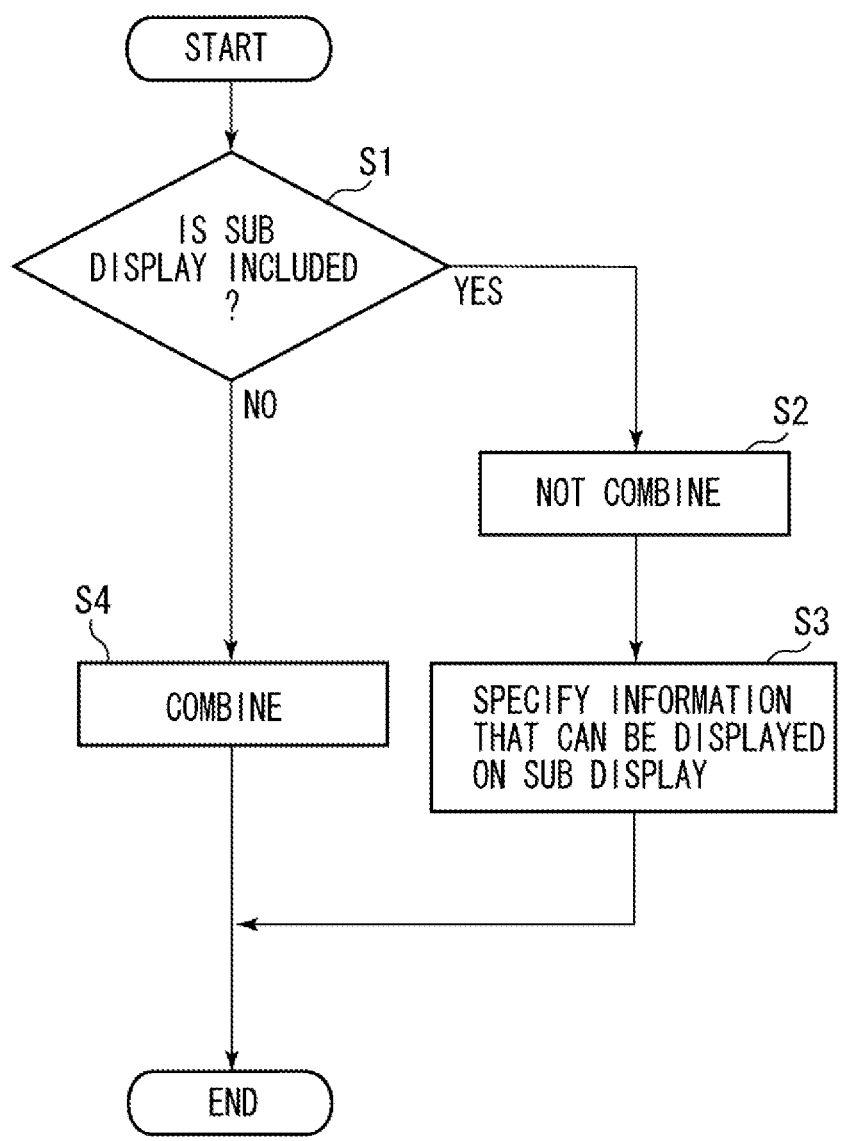
FIG. 2 is a flowchart illustrating an operation of a determination unit illustrated in FIG. 1.

FIG. 2 is a flowchart illustrating an operation of the determination unit 17 in the video output apparatus 10. In step S1, based on attribute information (identification information (a manufacturer name, a model number, or the like)) of the display apparatus 20 acquired by the attribute information acquisition unit 16, the determination unit 17 refers to a determination table and determines whether the display apparatus 20 includes a sub display.

FIG. 3 is a diagram illustrating an example of the determination table used for the determination operation in the determination unit 17. Such a determination table is stored in the video output apparatus 10 in advance. With reference to the determination table in FIG. 3, it is determined that a model number "A-ooX1000" and a model number "A-ooX2000" of a manufacturer name "AAA", and a model number "B-ooX1000" of a manufacturer name "BBB" do not include sub displays. Further, it is determined that a model number "A-ooX3000" of the manufacturer name "AAA", and a model number "B-ooX2000" and a model number "B-ooX3000" of the manufacturer name "BBB" include sub displays.

However, the determination unit 17 is not always required to use the determination table illustrated in FIG. 3. For example, the determination unit 17 can acquire attribute information that indicates whether the display apparatus 20 includes a sub display (or, whether the display apparatus 20 includes a plurality of displays).

In step S1, if it is determined that the display apparatus 20 includes a sub display (YES in step S1), the processing proceeds to step S2. In step S2, the determination unit 17 determines not to superimpose the additional information on the video signal output from the video decoding unit 12. On the other hand, in step S1, if it is determined that the display apparatus 20 does not include a sub display (NO in step S1), the processing proceeds to step S4. In step S4, the determination unit 17 determines to superimpose the additional information on the video signal output from the video decoding unit 12.

After determining not to superimpose the additional information on the video signal in step S2, the processing proceeds to step S3. In step S3, the determination unit 17 specifies information that can be displayed on the sub display in the additional information extracted by the additional information extraction unit 13. In this case, the determination unit 17 refers to the determination table illustrated in FIG. 3. For example, the determination unit 17 determines that the information, which the model number "A-ooX3000" of the manufacturer name "AAA" can display on the sub display, is "file name" and "shooting date and time". Further, the determination unit 17 determines that the information, which the model number "B-ooX2000" of the manufacturer name "BBB" can display on the sub display, is "file name", "shooting date and time", "shutter speed", and "ISO sensitivity". The determination unit 17 determines that the model number "B-ooX3000" can further display "thumbnail image" on the sub display. Then, the information that is specified to be displayable on the sub display is transmitted from the video output apparatus 10 to the display apparatus 20. However, the processing in step S3 can be omitted and all additional information extracted by the additional information extraction unit 13 can be transmitted to the display apparatus 20. Then, necessary information can be selected in the display apparatus 20 and displayed on the sub display 27.

Since the display apparatus 20 illustrated in FIG. 1 includes the sub display 27, the video signal and the additional information are individually transmitted from the video output apparatus 10 to the display apparatus 20 without being superimposed.

Figure 4:
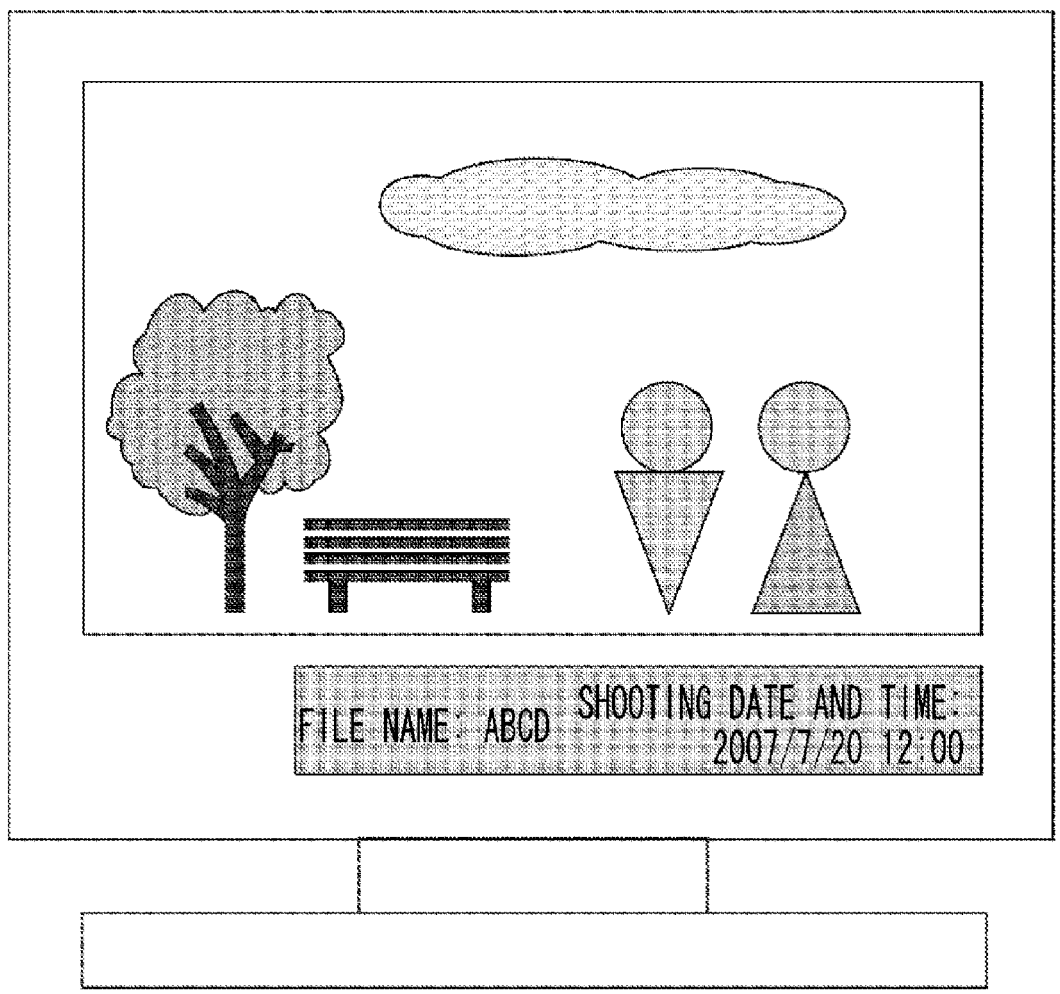
FIG. 4 is a view illustrating an example of a screen display in a case where additional information is transmitted without being superimposed on a video signal.

FIG. 4 is a view illustrating an example of a screen display in a case where additional information is transmitted without being superimposed on a video signal. On the main display 26, an image of reproduced image data is displayed. On the sub display 27, additional information associated with the image data displayed on the main display is displayed. For example, on the screens of the display apparatuses of the model number "A-ooX3000" of the manufacturer name "AAA", and the model number "B-ooX2000" and the model number "B-ooX3000" of the manufacturer name "BBB", as illustrated in FIG. 4, file name and shooting date and time are displayed.

When the image data being displayed on the main display 26 is switched to next image data, the additional information being displayed on the sub display 27 is also switched. For example, when still image data is displayed as slide show, the additional information also is switched in synchronization with the switching timing of the image data.

The display apparatuses of the model number "B-ooX2000" and the model number "B-ooX3000" of the manufacturer name "BBB" can display "shutter speed", "ISO sensitivity", "thumbnail images (a list of a plurality of thumbnail images), and the like in addition to "file name" and "shooting date and time" on the sub displays. In such a case, the user can operate each of the remote controllers of the display apparatuses and switch the information to be displayed on the sub displays.

Figure 5:
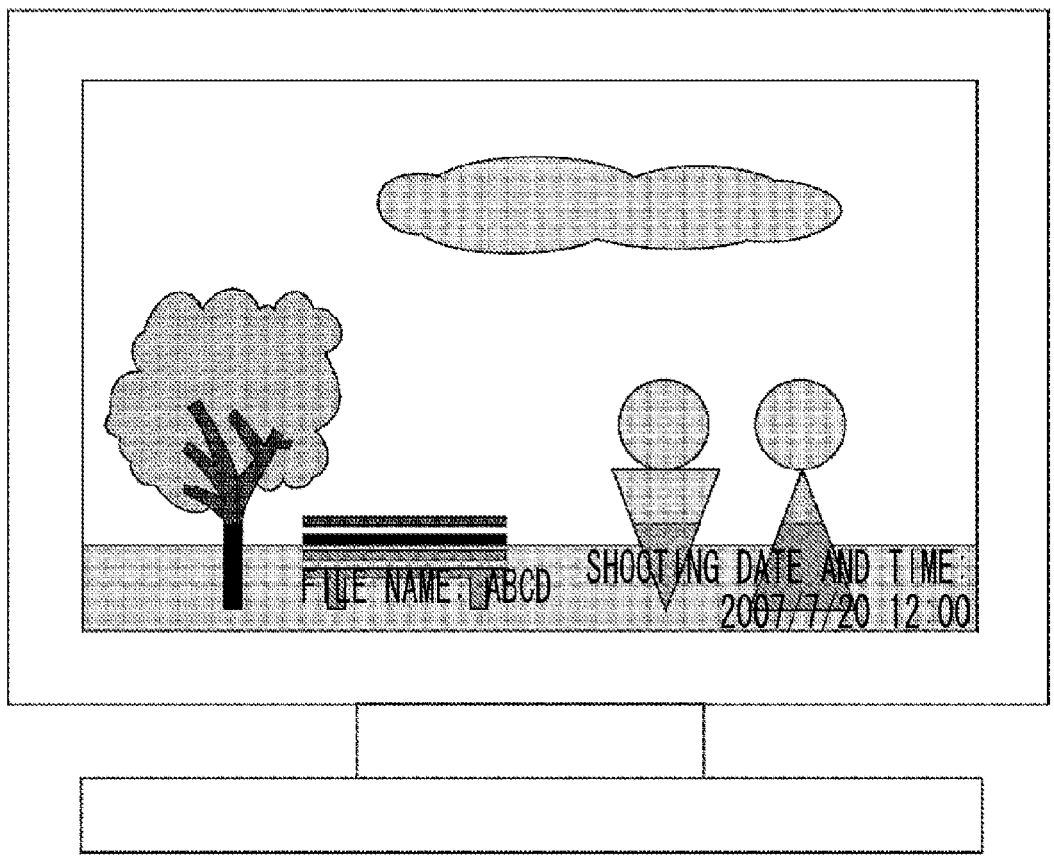
FIG. 5 is a view illustrating an example of a screen display in a case where additional information is superimposed on a video signal and transmitted.

FIG. 5 is a view illustrating an example of a screen display in a case where additional information is superimposed on a video signal and is then transmitted. On the main display, the additional information is superimposed on the image of the reproduced image data. For example, the screens of the display apparatuses of the model number "A-ooX1000" and the model number "A-ooX2000" of the manufacturer name "AAA", and the model number "B-ooX1000" of the manufacturer name "BBB" are displayed as illustrated in FIG. 5.

As described above, in the first exemplary embodiment of the present invention, an image and additional information can be output to a display apparatus in an appropriate transmission method based on attribute information of the display apparatus. Accordingly, the problem that the viewing of the image is interrupted can be solved.

Further, even if a display apparatus includes a sub display, the video output apparatus can acquire setting information or an operation mode of the display apparatus and can perform superimposing processing corresponding to the acquired information. For example, in a case where the display apparatus is under a setting or in an operation mode in which another information can be preferentially displayed on the sub display and additional information of image data is not displayed, the additional information can be superimposed on a video signal to be displayed in an superimposed manner.

In the above description, the case in which the video output apparatus 10 determines whether to superimpose the additional information on the video signal based on attribute information of the display apparatus 20 has been described. However, the display apparatus 20 can determine a transmission method for the video output apparatus 10. More specifically, after a communication is established between the video output apparatus 10 and the display apparatus 20, a command for setting an appropriate transmission method can be transmitted from the display apparatus 20 to the video output apparatus 10. Further, a program to determine an optimal communication speed corresponding to an operation state of the video output apparatus 10 and the display apparatus 20 can be transmitted form the display apparatus 20 to the video output apparatus 10. Further, a program, which deletes additional information that cannot be displayed on the sub display 27 at the video output apparatus 10 and transmits the information, can be transmitted from the display apparatus 20 to the video output apparatus 10.

Figure 6:
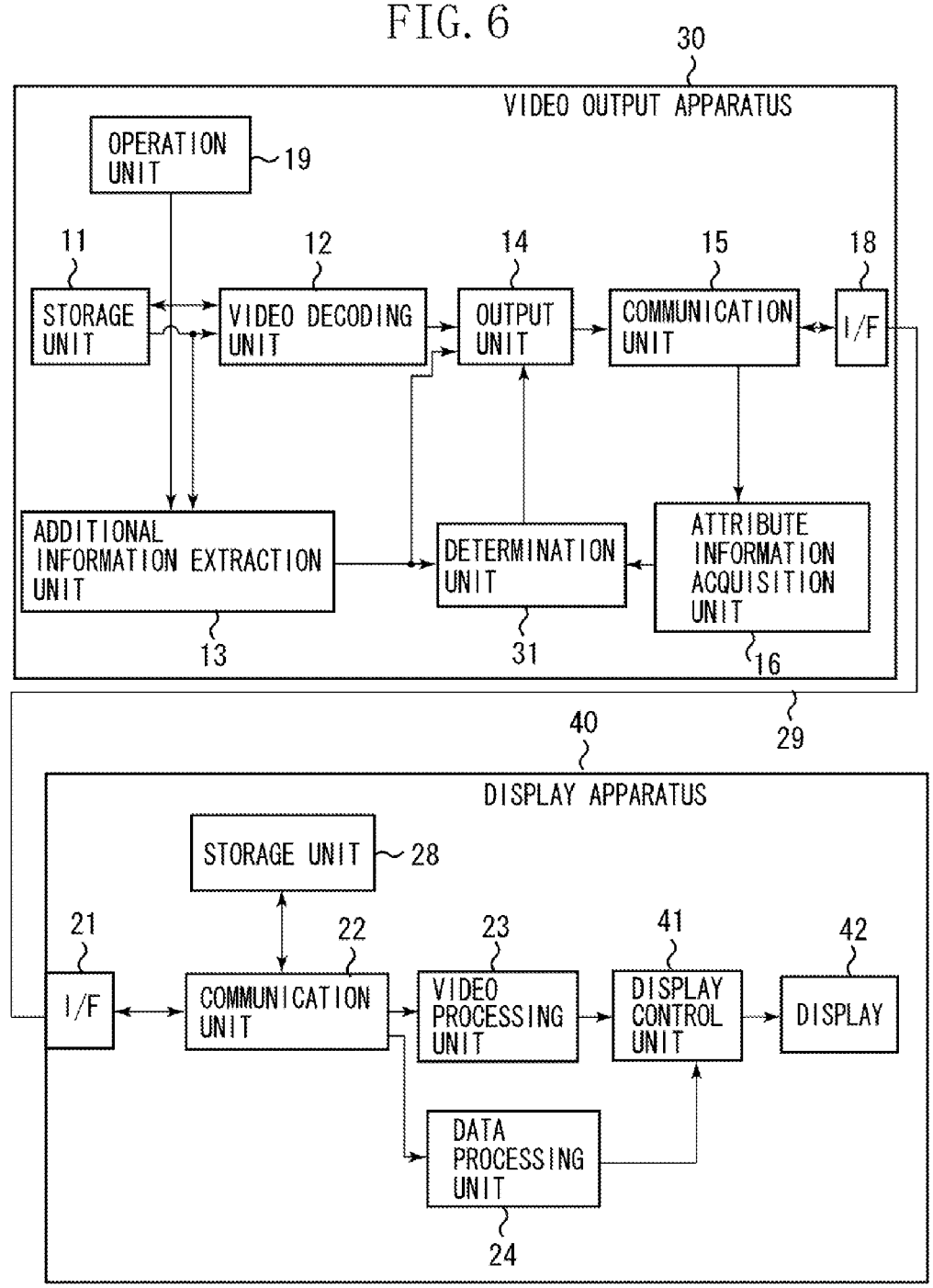
FIG. 6 is a block diagram illustrating an example of a modification of the first exemplary embodiment of the present invention.

FIG. 6 is a block diagram illustrating an example of a modification of the first exemplary embodiment of the present invention. In FIG. 6, the same reference numbers denote blocks that function similar to those in FIG. 1, and their descriptions are not repeated.

A determination unit 31 in a video output apparatus 30 determines whether to superimpose the additional information extracted by the additional information extraction unit 13 on the video signal output from the video signal decoding unit 12 based on attribute information of a display apparatus 40 acquired by the attribute information acquisition unit 16. More specifically, with reference to a determination table, the determination unit 31 determines whether the display apparatus 40 has a function compliant with a non-superimposed transmission method for transmitting a video signal and additional information such as identification information (a manufacturer name, a model number, or the like) without superimposing the additional information on the video signal.

FIG. 7 is a diagram illustrating an example of the determination table used for the determination operation in the determination unit 31. With reference to the determination table in FIG. 7, it is determined that a model number "A-ooY1000" and a model number "A-ooY2000" of the manufacturer name "AAA", and a model number "B-ooY1000" of the manufacturer name "BBB" do not support the non-superimposed transmission method. Further, it is determined that a model number "A-ooY3000" of the manufacturer name "AAA", and a model number "B-ooY2000" and a model number "B-ooY3000" of the manufacturer name "BBB" support the non-superimposed transmission method.

However, the determination unit 31 is not always required to use the determination table illustrated in FIG. 7. For example, the determination unit 31 can acquire attribute information that indicates whether the display apparatus 40 includes a sub display (or, whether the display apparatus 40 includes a plurality of displays).

Returning to FIG. 6, the output unit 14, in a case where the determination unit 31 determines that the display apparatus 40 supports the non-superimposed transmission method, outputs the additional information extracted by the extraction unit 13 and the video signal output from the video decoding unit 12 to the communication unit 15 without superimposing the additional information on the video signal. The output unit 14, in a case where the determination unit 31 determines that the display apparatus 40 does not support the non-superimposed transmission method, superimposes the additional information extracted by the additional information extraction unit 13 on the video signal output from the video decoding unit 12, and outputs the additional information superimposed on the video signal to the communication unit 15.

In a case where the display apparatus 40 supports the non-superimposed transmission method, the additional information is not superimposed on the video signal and transmitted from the video output apparatus 30 to the display apparatus 40. A display control unit 41 in the display apparatus 40 superimposes the additional information output from the data processing unit 24 on the video signal output from the video processing unit 23 and outputs the additional information superimposed on the video signal to a display 42.

Figure 8:
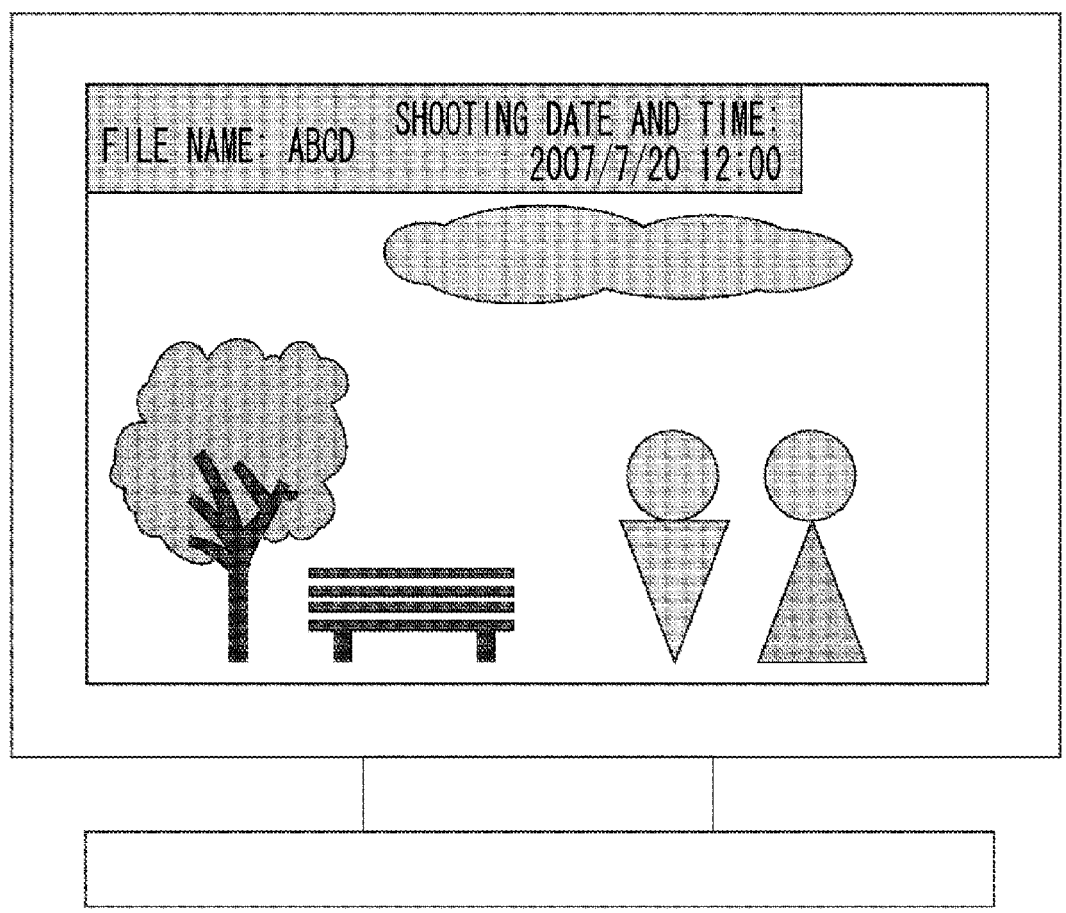
FIG. 8 is a view illustrating an example of a screen display in a case where additional information is transmitted without being superimposed on a video signal.

FIG. 8 is a view illustrating an example of a screen display in a case where additional information is transmitted without being superimposed on the video signal. In the display, on a part of a region of reproduced image data, additional information (for example, file name and shooting data and time) is superimposed.

The fineness of the characters of the additional information displayed on the screen is higher in the case illustrated in FIG. 8 where the additional information is superimposed on the video signal at the display apparatus side than the case where the additional information is superimposed on the video signal at the video output apparatus side and is then transmitted. That is because the video output apparatus 30, such as a digital camera, is designed to display an image on a small display provided in the video output apparatus body. On the other hand, generally, the superimposing processing function of the stationary display apparatus 40 that has a large screen display is superior to that of the video output apparatus 30. Accordingly, the fineness of the characters of the additional information is higher if the superimposing processing is performed at the display apparatus side than at the video output apparatus side. In addition, the superimposing processing function of the video output apparatus 30 can be compared with that of the display apparatus 40 to allow the one having a superior function to perform the superimposing processing.

As described above, in the modification of the first exemplary embodiment, an image and additional information can be output to a display apparatus in an appropriate transmission form based on attribute information of the display apparatus. Accordingly, the decrease in the fineness of characters of the additional information can be reduced.

FIG. 9 is a block diagram illustrating a configuration of a display system according to a second exemplary embodiment of the present invention. In FIG. 9, the same reference numbers denote blocks that function similar to those in FIG. 1, and their descriptions are not repeated.

An OSD image generation unit 51 in a video output apparatus 50, in response to an instruction by the user, generates various OSD images, such as a still image reproduction menu, a moving image reproduction menu, a still image editing menu, a moving image editing menu, a setting menu, and a print menu.

The determination unit 52 determines whether to superimpose an OSD image on a video signal output from the video signal decoding unit 12 based on attribute information of the display apparatus 20 acquired by the attribute information acquisition unit 16. A flowchart illustrating an operation of the determination unit 52 is similar to that illustrated in FIG. 2, and its description is not repeated.

FIG. 10 is a diagram illustrating an example of a determination table used for the determination operation in the determination unit 52. With reference to the determination table in FIG. 10, it is determined that a model number "A-ooZ1000" and a model number "A-ooZ2000" of the manufacturer name "AAA", and a model number "B-ooZ1000" of the manufacturer name "BBB" do not include sub displays. Based on the determination, it is determined to superimpose the OSD image on the video signal output from the video decoding unit 12. Further, it is determined that a model number "A-ooZ3000" of the manufacturer name "AAA", and a model number "B-ooZ2000" and a model number "B-ooZ3000" of the manufacturer name "BBB" include sub displays. In the case of the model number "A-ooZ3000" of the manufacturer name "AAA", the still image reproduction menu screen can be displayed on the sub display. Accordingly, it is determined not to superimpose the still image reproduction menu screen on the video signal output from the video decoding unit 12. However, the other menu screens cannot be displayed on the sub display. Accordingly, it is determined to superimpose the menu screens on the video signal output from the video decoding unit 12. In the case of the model number "B-ooZ2000" of the manufacturer name "BBB", the still image reproduction menu screen and the moving image reproduction menu screen can be displayed on the sub display. Accordingly, it is determined not to superimpose the still image reproduction menu screen and the moving image reproduction menu screen on the video signal output from the video decoding unit 12. In the case of the model number "B-ooZ3000" of the manufacturer name "BBB", the still image reproduction menu screen, the moving image reproduction menu screen, the still image editing menu screen, and the moving image editing menu screen can be displayed on the sub display. Accordingly, it is determined not to superimpose the still image reproduction menu screen, the moving image reproduction menu screen, the still image editing menu screen, and the moving image editing menu screen on the video signal output from the video decoding unit 12.

The OSD image data that is determined to be displayable on the sub display is transmitted from the video output apparatus 50 to the display apparatus 20 in a scalable vector graphics (SVG) format. The data processing unit 24 in the display apparatus 20 performs drawing processing on the OSD image data of the SVG format.

Figure 11:
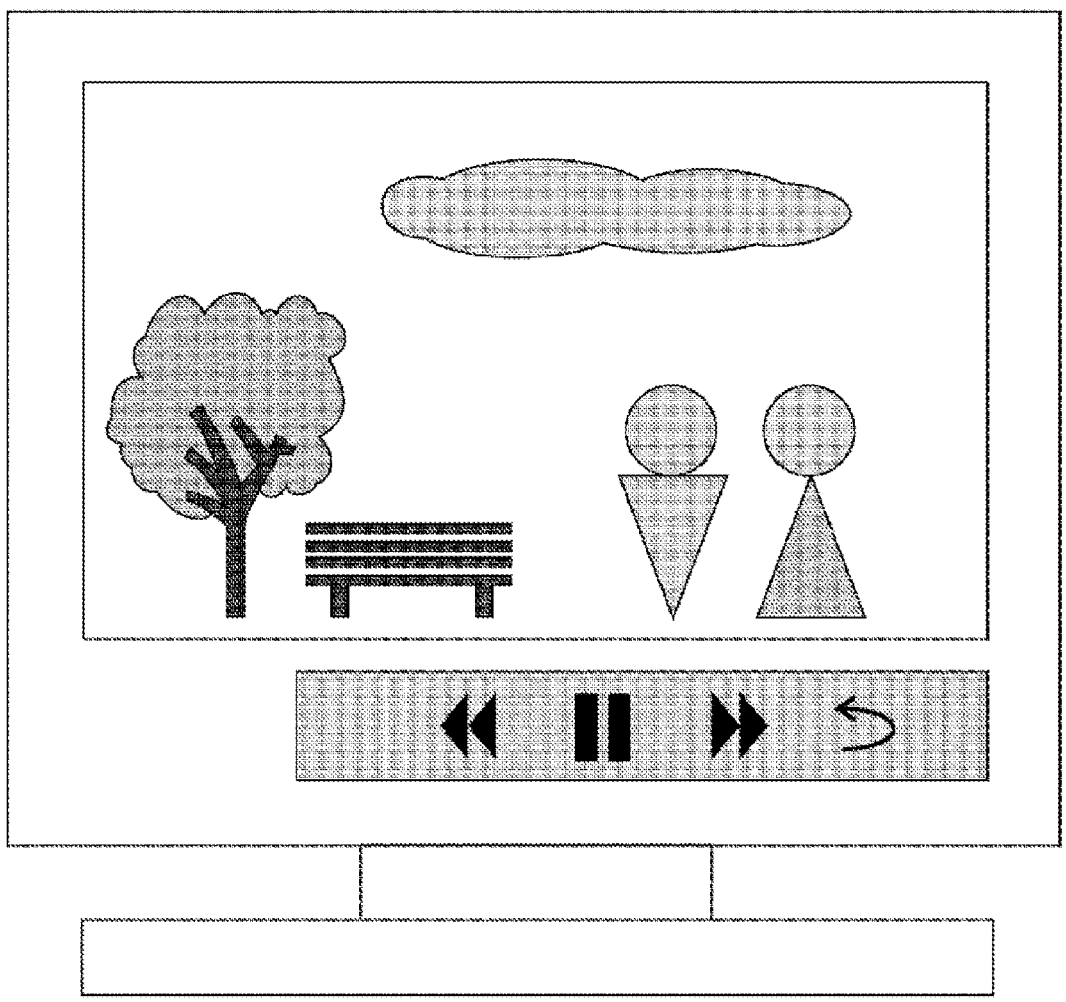
FIG. 11 is a view illustrating an example of a screen display in a case where OSD image data is transmitted without being superimposed on a video signal.

FIG. 11 is a view illustrating an example of a screen display in a case where OSD image data is transmitted from a video output apparatus to a display apparatus without being superimposed on a video signal. For example, in the case of a display apparatus of the model number "A-ooZ3000" of the manufacturer name "AAA", as illustrated in FIG. 11, on a main display, an image of reproduced image data is displayed, and on a sub display, a still image reproduction menu screen is displayed.

Figure 12:
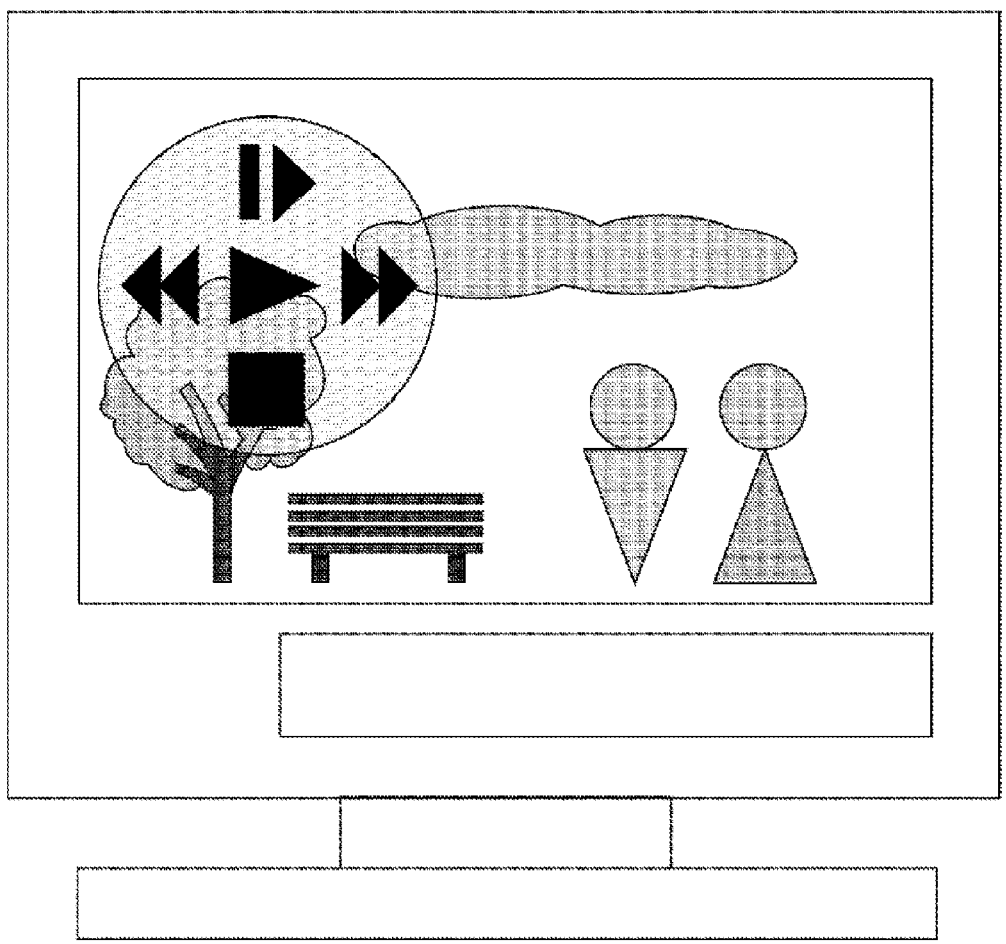
FIG. 12 is a view illustrating an example of a screen display in a case where OSD image data is superimposed on a video signal and transmitted.

FIG. 12 is a view illustrating an example of a screen display in a case where OSD image data is superimposed on a video signal and is then transmitted from a video output apparatus 50 to a display apparatus 20. For example, in the case of the display apparatus of the model number "A-ooZ3000" of the manufacturer name "AAA", as illustrated in FIG. 12, on a main display 26, a moving image reproduction menu screen is superimposed on an image of reproduced image data.

As described above, in the second exemplary embodiment of the present invention, a similar effect to that in the first exemplary embodiment can be obtained. More specifically, in the second exemplary embodiment of the present invention, an image and an OSD image can be output to a display apparatus in an appropriate transmission form based on attribute information of the display apparatus. Accordingly, the problem that the viewing of the image is interrupted can be solved. Further, the decrease in the resolution of the OSD image can be reduced.

Figure 13:
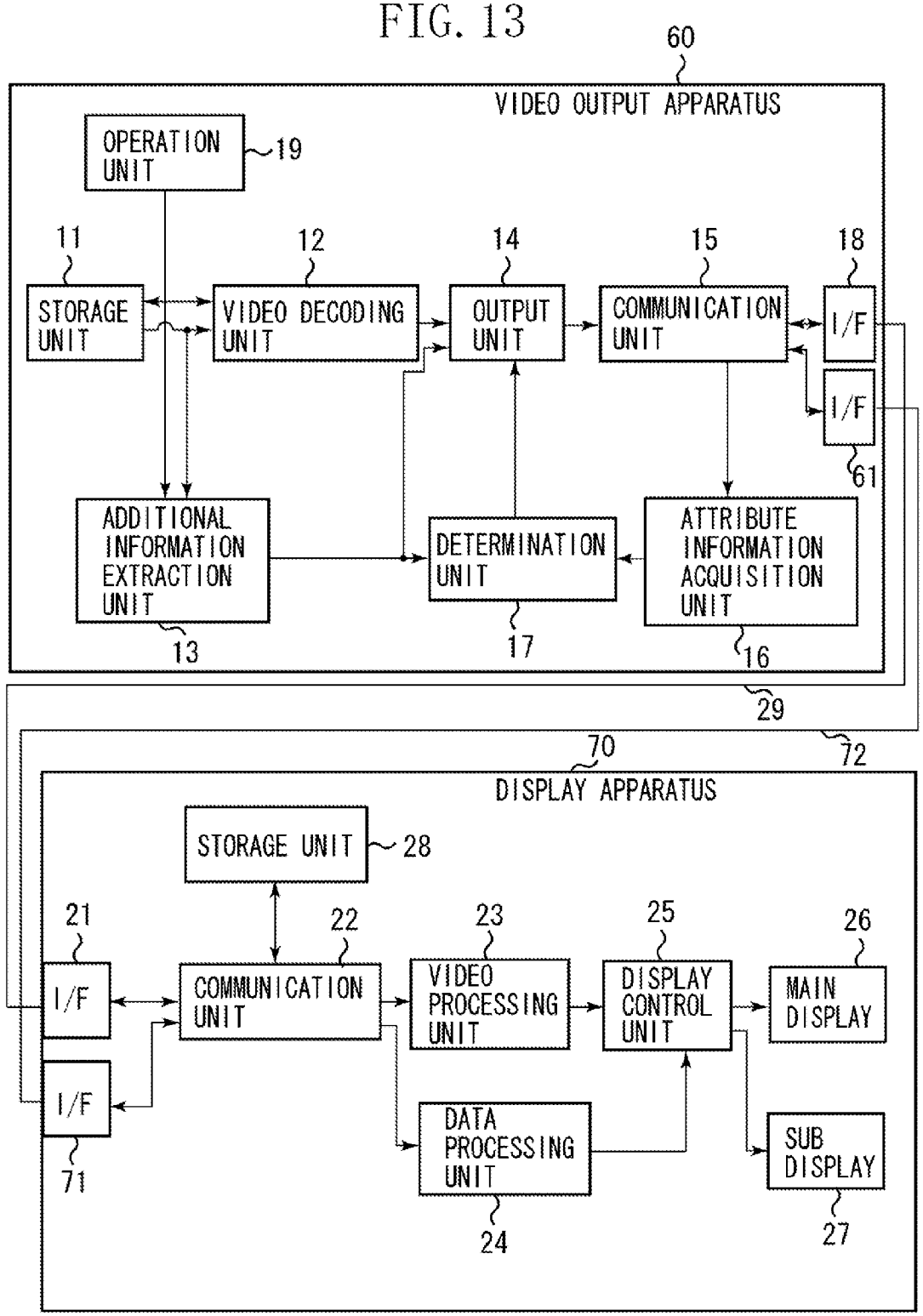
FIG. 13 is a block diagram illustrating a configuration of a display system according to a third exemplary embodiment of the present invention.

FIG. 13 is a block diagram illustrating a configuration of a display system according to a third exemplary embodiment of the present invention. In FIG. 13, the same reference numbers denote blocks that function similar to those in FIG. 1, and their descriptions are not repeated.

The communication I/F 18 in a video output apparatus 60 is interconnected with the communication I/F 21 in a display apparatus 70 via the cable 29. A communication I/F 61 in the video output apparatus 60 is interconnected with a communication I/F 71 in the display apparatus 70 via a cable 72. The cable 29 can transmit a video signal, and the cable 72 can transmit additional information or attribute information. The cable 29 is compliant with the HDMI standard, the DVI standard, and the like. For example, in the case of the HDMI cable, a video signal is transmitted by a Transition Minimized Differential Signaling (TMDS) transfer channel. The cable 72 is compliant with the universal serial bus (USB) standard, the Institute of Electrical and Electronics Engineers (IEEE) 1394 standard, the Recommended Standard (RS) 232C standard, the HDMI standard, and the like. For example, in the case of the HDMI cable, to transmit or receive additional information or attribute information, a CEC transfer channel or a DDC transfer channel is used.

In the third exemplary embodiment of the present invention, the cable 29, which is used to transmit a video signal, and the cable 72, which is used to transmit additional information or attribute information, are provided, and the cables individually transmit different data. The configuration enables the system to use an appropriate cable depending on a type of data to be transmitted and to increase the transmission speed.

Figure 14:
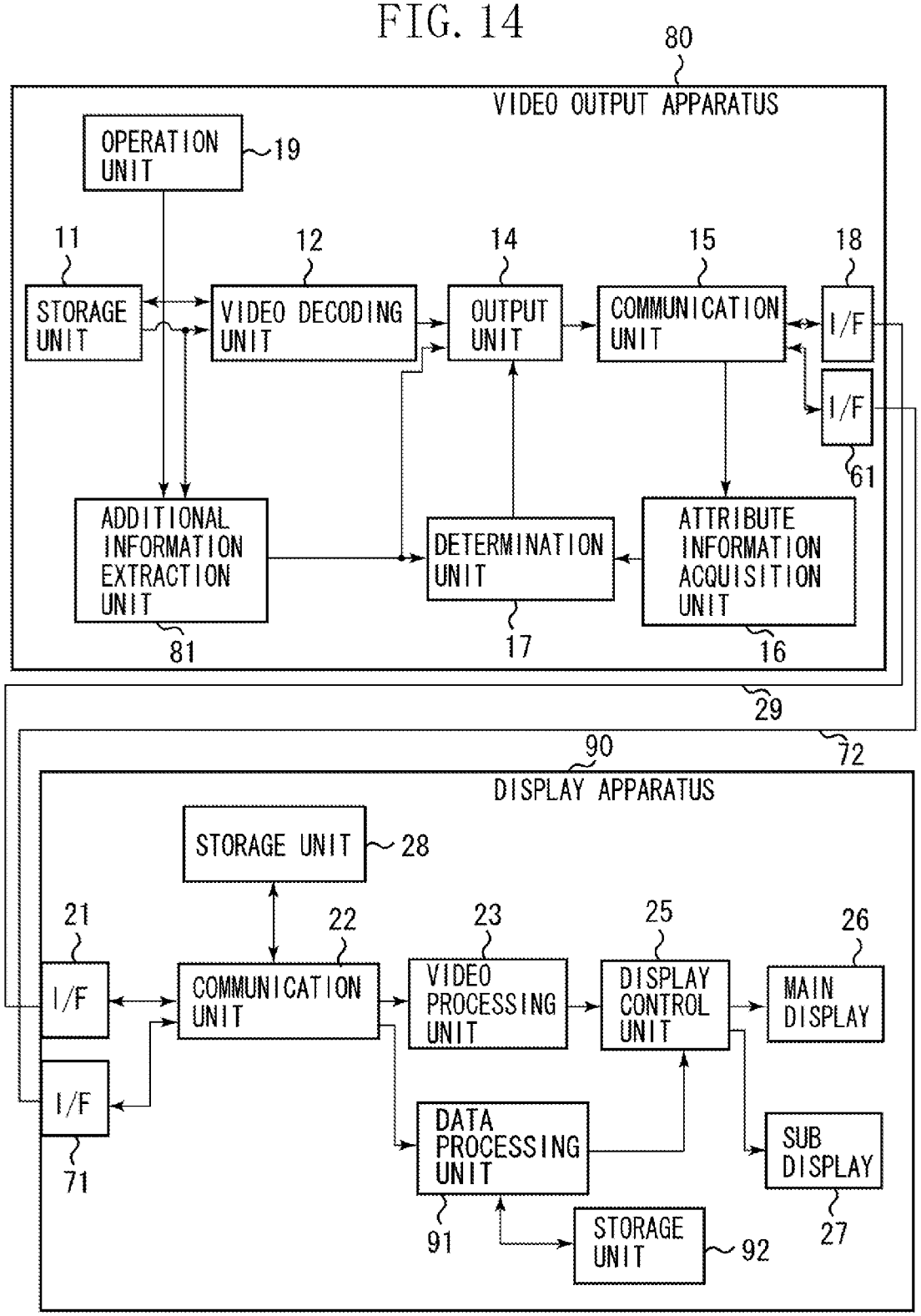
FIG. 14 is a block diagram illustrating a configuration of a display system according to a fourth exemplary embodiment of the present invention.

FIG. 14 is a block diagram illustrating a configuration of a display system according to a fourth exemplary embodiment of the present invention. In FIG. 14, the same reference numbers denote blocks that function similar to those in FIG. 13, and their descriptions are not repeated.

In a case where an information amount of additional information to be transmitted via the cable 72 is large, due to a regulation in such as a transmission band of the cable, the transmission of the additional information may be delayed. As a result, in the configuration according to the third exemplary embodiment, it may be difficult to synchronously display the video signal and the additional information.

To solve the problem, in the fourth exemplary embodiment, in a case where a user of a video output apparatus 80 operates the operation unit 19 and instructs to consecutively reproduce a plurality of pieces of image data, an additional information extraction unit 81 extracts the additional information of the plurality of pieces of image data at a time. The extracted additional information of the plurality of pieces of image data is transmitted to a display apparatus 90 via the output unit 14, the communication unit 15, and the communication I/F 61 at a time.

A data processing unit 91 in the display apparatus 90 temporarily stores the additional information of the plurality of pieces of image data transmitted from the video output apparatus 80 in a storage unit 92. The data processing unit 91 sequentially reads the additional information from the storage unit 92 in synchronization with a switching timing of the image data displayed on the main display 26. Accordingly, the additional information corresponding to the image data displayed on the main display 26 can be synchronously displayed on the sub display 27.

The case where the plurality of pieces of image data is consecutively reproduced includes, for example, a case where a plurality of pieces of still image data is reproduced as a slide-show, and a case where a play list is provided and a plurality of pieces of moving image data is consecutively reproduced. It is not always necessary to transmit the additional information of the plurality of pieces of image data at a time, but if there is an spare band in the transfer band, additional information of the next image data can be transmitted in advance.

What is claimed is:

1. An image output apparatus comprising:
    a first generating unit that generates, based on first image data and first information, second image data;
    an interface that is used for connecting an external device via a cable, wherein the cable includes a first path, a second path, a third path, and a fourth path;
    a first output unit that outputs the first image data or the second image data to the external device via the first path, wherein the external device includes a second generating unit that generates, based on the first image data and the first information, third image data;
    a second output unit that outputs the first information to the external device via the second path;
    a receiving unit that receives a control signal from the external device via the third path;
    an acquiring unit that acquires second information including identification information of the external device from the external device via the fourth path; and
    a control unit that (a) detects, using the second information acquired from the external device, a function of the second generating unit, (b) selects, based on a detected function of the second generating unit, either the first image data or the second image data, and (c) causes the first output unit to output selected image data to the external device via the first path.

2. The image output apparatus according to claim 1, wherein the first information includes information relating to image data to be outputted to the external device.

3. The image output apparatus according to claim 1, wherein the first information includes at least one of information indicating a file name, information indicating a shooting date, and information indicating a shooting time.

4. The image output apparatus according to claim 1, wherein the first information includes at least one of information indicating a shutter speed and information indicating an ISO sensitivity.

5. The image output apparatus according to claim 1, wherein the first information includes at least one of a reproduction menu, an editing menu, a setting menu, and a print menu.

6. A method for controlling an image output apparatus, wherein the image output apparatus includes an interface that is used for connecting an external device via a cable, wherein the cable includes a first path, a second path, a third path, and a fourth path, the method comprising:
    generating, based on first image data and first information, second image data;
    outputting the first image data or the second image data to the external device via the first path;
    outputting the first information to the external device via the second path;
    receiving a control signal from the external device via the third path;
    acquiring second information including identification information of the external device from the external device via the fourth path;
    detecting, using the second information acquired from the external device, a function of a generating unit included in the external device, wherein the generating unit generates, based on the first image data and the first information, third image data;
    selecting, based on a detected function of the generating unit, either the first image data or the second image data; and
    outputting selected image data to the external device via the first path.

7. A non-transitory storage medium storing a program which, when executed by a computer, causes the computer to perform a method for controlling an image output apparatus, wherein the image output apparatus includes an interface that is used for connecting an external device via a cable, wherein the cable includes a first path, a second path, a third path, and a fourth path, the method comprising:
    generating, based on first image data and first information, second image data;
    outputting the first image data or the second image data to the external device via the first path;
    outputting the first information to the external device via the second path;
    receiving a control signal from the external device via the third path;
    acquiring second information including identification information of the external device from the external device via the fourth path;
    detecting, using the second information acquired from the external device, a function of a generating unit included in the external device, wherein the generating unit generates, based on the first image data and the first information, third image data;
    selecting, based on a detected function of the generating unit, either the first image data or the second image data; and
    outputting selected image data to the external device via the first path.

8. The image output apparatus according to claim 1, wherein the first information includes on screen display (OSD) image data.

9. The image output apparatus according to claim 1, wherein the control unit selects, based on a function of the first generating unit and the function of the second generating unit, either the first image data or the second image data.

10. The image output apparatus according to claim 1, wherein the control unit selects, based on a result of comparison with a function of the first generating unit and the function of the second generating unit, either the first image data or the second image data.

11. An image output apparatus comprising:
    a first generating unit that generates, based on first image data and first information, second image data;
    a first output unit that outputs the first image data or the second image data to an external device;

a second output unit that outputs the first information to the external device;
an acquiring unit that acquires second information including identification information of the external device from the external device; and
a control unit that (a) detects, using the second information acquired from the external device, a function of a second generating unit included in the external device, (b) selects, based on a detected function of the second generating unit, either the first image data or the second image data, and (c) causes the first output unit to output selected image data to the external device, wherein the second generating unit generates, based on the first image data and the first information, third image data.

12. The image output apparatus according to claim 11, wherein the first information includes information relating to image data to be outputted to the external device.

13. The image output apparatus according to claim 11, wherein the first information includes at least one of information indicating a file name, information indicating a shooting date, and information indicating a shooting time.

14. The image output apparatus according to claim 11, wherein the first information includes at least one of information indicating a shutter speed and information indicating an ISO sensitivity.

15. The image output apparatus according to claim 11, wherein the first information includes at least one of a reproduction menu, an editing menu, a setting menu, and a print menu.

16. The image output apparatus according to claim 11, wherein the first information includes on screen display (OSD) image data.

17. The image output apparatus according to claim 11, wherein the control unit selects, based on a function of the first generating unit and the function of the second generating unit, either the first image data or the second image data.

18. The image output apparatus according to claim 11, wherein the control unit selects, based on a result of comparison with a function of the first generating unit and the function of the second generating unit, either the first image data or the second image data.

19. A method comprising:
generating, based on first image data and first information, second image data;
outputting the first image data or the second image data to an external device;
outputting the first information to the external device;
acquiring second information including identification information of the external device from the external device;
detecting, using the second information acquired from the external device, a function of a generating unit included in the external device, wherein the generating unit generates, based on the first image data and the first information, third image data;
selecting, based on a detected function of the generating unit, either the first image data or the second image data; and
outputting selected image data to the external device.

20. A non-transitory storage medium storing a program which causes a computer to perform a method, the method comprising:
generating, based on first image data and first information, second image data;
outputting the first image data or the second image data to an external device;
outputting the first information to the external device;
acquiring second information including identification information of the external device from the external device;
detecting, using the second information acquired from the external device, a function of a generating unit included in the external device, wherein the generating unit generates, based on the first image data and the first information, third image data;
selecting, based on a detected function of the generating unit, either the first image data or the second image data; and
outputting selected image data to the external device.

* * * * *